(12) United States Patent
Tiberghien et al.

(10) Patent No.: US 10,808,873 B2
(45) Date of Patent: Oct. 20, 2020

(54) FEMALE COUPLING ELEMENT, TO BE COUPLED WITH A COMPLEMENTARY MALE ELEMENT AND COUPLING COMPRISING SUCH A FEMALE ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR); Frederic Morel, Lathuile (FR)

(73) Assignee: STAUBLI FAVERGES, Faverges (FR)

( * ) Notice: Subject to any disclaimer, the term of this patent is extended or adjusted under 35 U.S.C. 154(b) by 273 days.

(21) Appl. No.: 15/833,164

(22) Filed: Dec. 6, 2017

(65) Prior Publication Data

US 2018/0180208 A1 Jun. 28, 2018

(30) Foreign Application Priority Data

Dec. 23, 2016 (FR) ...................................... 16 63345

(51) Int. Cl.
*F16L 37/22* (2006.01)
*F16L 37/14* (2006.01)
(Continued)

(52) U.S. Cl.
CPC ......... *F16L 37/146* (2013.01); *F16L 37/0842* (2013.01); *F16L 37/138* (2013.01);
(Continued)

(58) Field of Classification Search
CPC ....... F16L 37/146; F16L 37/22; F16L 37/138; F16L 37/0842; F16L 37/34; F16L 37/23; F16L 37/08; F16L 37/38
(Continued)

(56) References Cited

U.S. PATENT DOCUMENTS 1,816,058 A * 7/1931 Slovinski ................ F16L 37/22
285/34
2,092,116 A 9/1937 Hansen
(Continued)

FOREIGN PATENT DOCUMENTS

| EP | 2048425 A1 | 4/2009 |
|---|---|---|
| EP | 2669560 A1 | 12/2013 |
| GB | 2283069 A | 4/1995 |

*Primary Examiner* — James M Hewitt, II
*Assistant Examiner* — James A Linford

(57) ABSTRACT

The invention relates to a female quick coupling element (200) comprising a hollow female body (204) defining a central axis (X200), locking members (208), each locking member being radially movable inside a corresponding radial opening (204.1) of the female body between a locked position and an unlocked position, at least one memory element (206), movable along a movement axis (D206) between a distal position, in which it opposes the movement of a locking member from the unlocked position to the locked position, and a proximal position, and a locking ring (218), which is axially movable between a forward position, in which it keeps the locking members in the locked position, and a withdrawn position. Each memory element (206) is received in a housing defined in the thickness of the body. Each memory element (206) is, in the distal position, closer to the central axis (X200) than the locking members (208) are in the unlocked position, and the movement axis (D206) of each memory element is inclined relative to the central axis (X200) of the female body.

15 Claims, 13 Drawing Sheets

Figure 1:
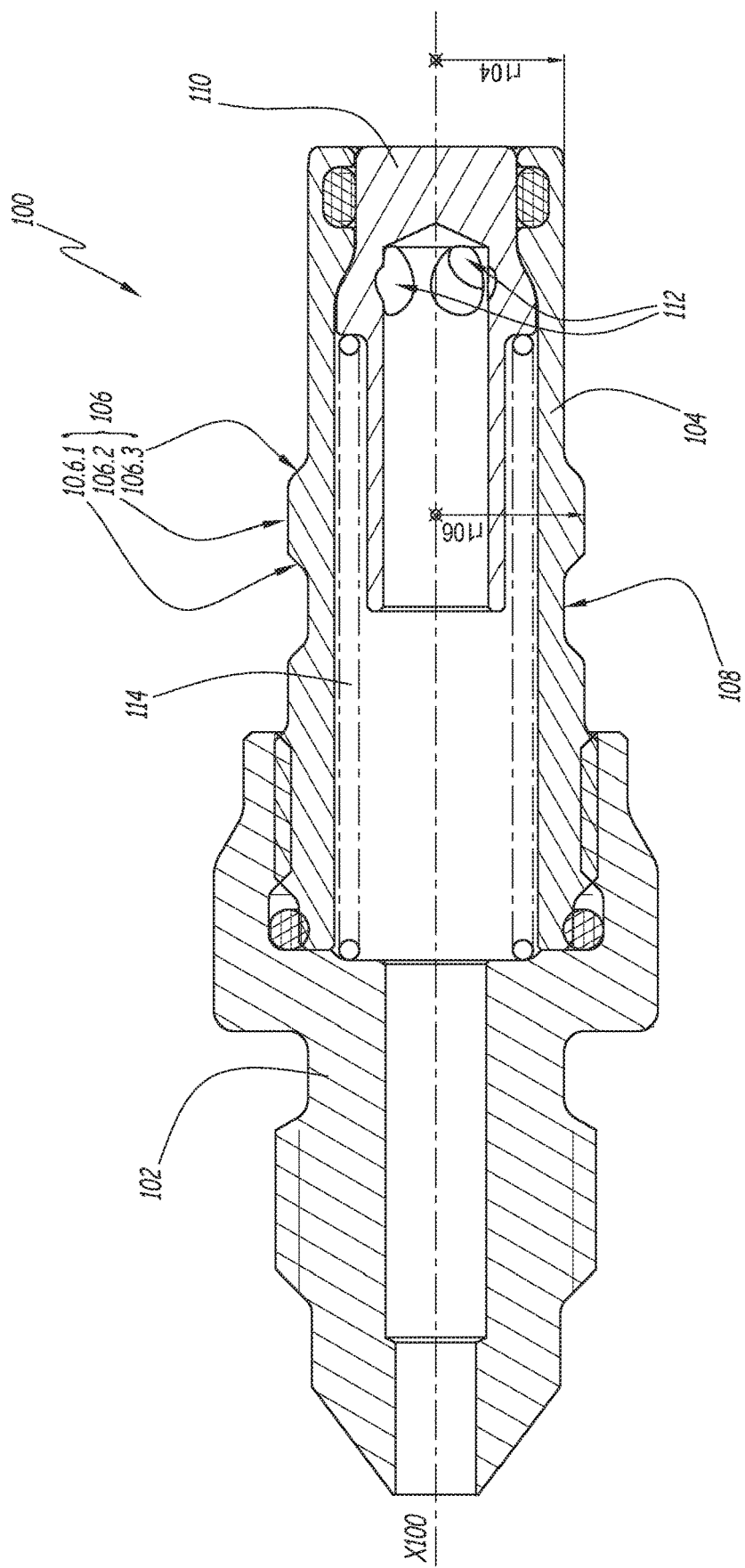

(51) Int. Cl.
   *F16L 37/23* (2006.01)
   *F16L 37/138* (2006.01)
   *F16L 37/084* (2006.01)
   *F16L 37/34* (2006.01)

(52) U.S. Cl.
   CPC .............. *F16L 37/22* (2013.01); *F16L 37/23* (2013.01); *F16L 37/34* (2013.01)

(58) Field of Classification Search
   USPC ................................................ 285/276, 277
   See application file for complete search history.

(56) References Cited

U.S. PATENT DOCUMENTS

| | | | | |
|---|---|---|---|---|
| 2,344,740 | A * | 3/1944 | Shaff | F16L 37/22 |
| | | | | 285/277 |
| 3,188,123 | A * | 6/1965 | Hansen | F16L 37/22 |
| | | | | 285/277 |
| 3,302,960 | A * | 2/1967 | Herrmann | F16B 21/165 |
| | | | | 403/325 |
| 4,060,219 | A * | 11/1977 | Crawford | F16L 37/23 |
| | | | | 251/149.6 |
| 5,439,258 | A * | 8/1995 | Yates | F16L 37/12 |
| | | | | 285/313 |
| 2004/0262917 | A1 * | 12/2004 | Sunohara | A61M 39/1011 |
| | | | | 285/277 |
| 2005/0023826 | A1 | 2/2005 | Naito | |
| 2009/0050836 | A1 * | 2/2009 | Chang | F16L 37/22 |
| | | | | 251/353 |
| 2014/0076417 | A1 * | 3/2014 | Lin | F16L 37/23 |
| | | | | 137/315.01 |
| 2017/0307123 | A1 * | 10/2017 | Liu | F16L 37/42 |

\* cited by examiner

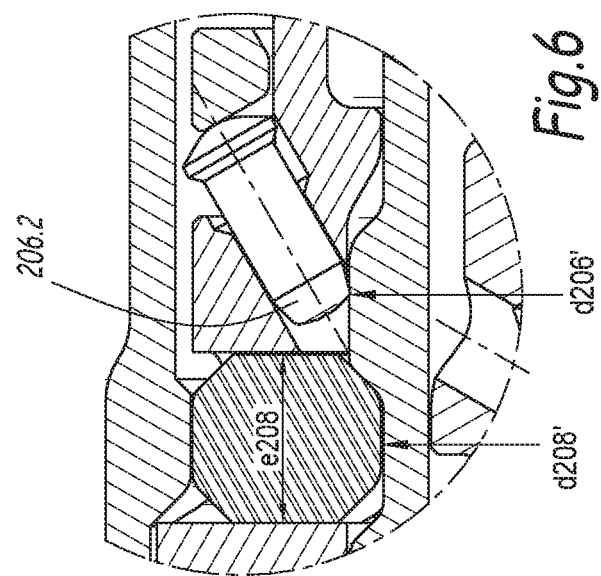
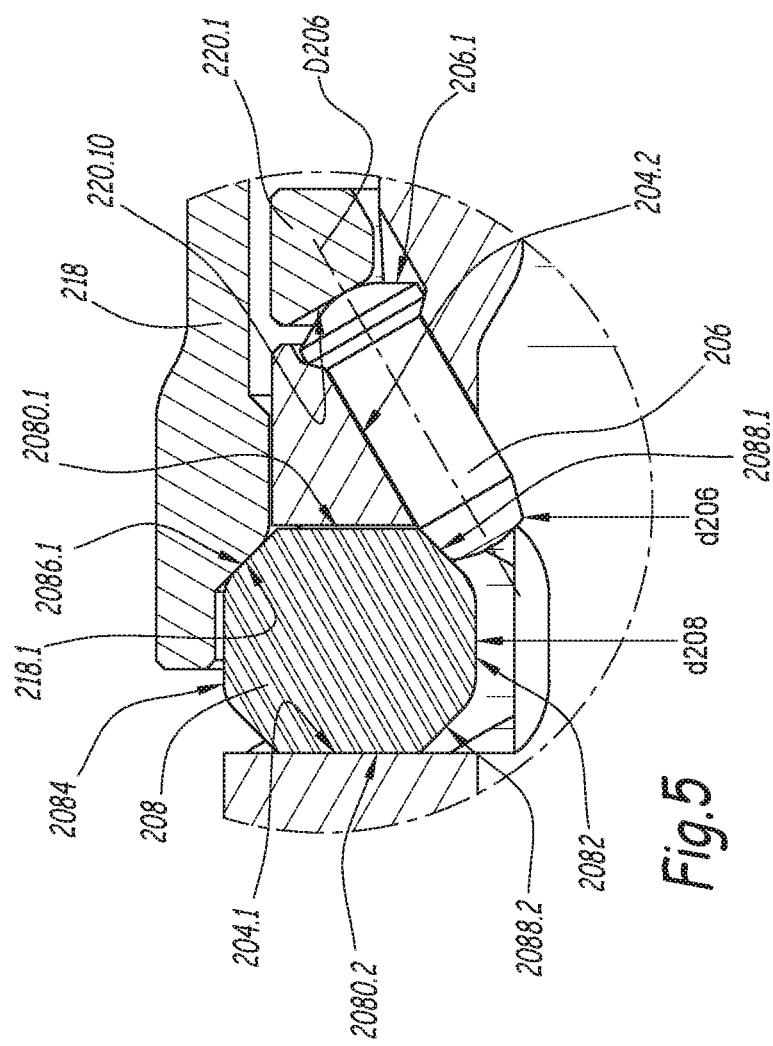
Fig.6
Fig.5

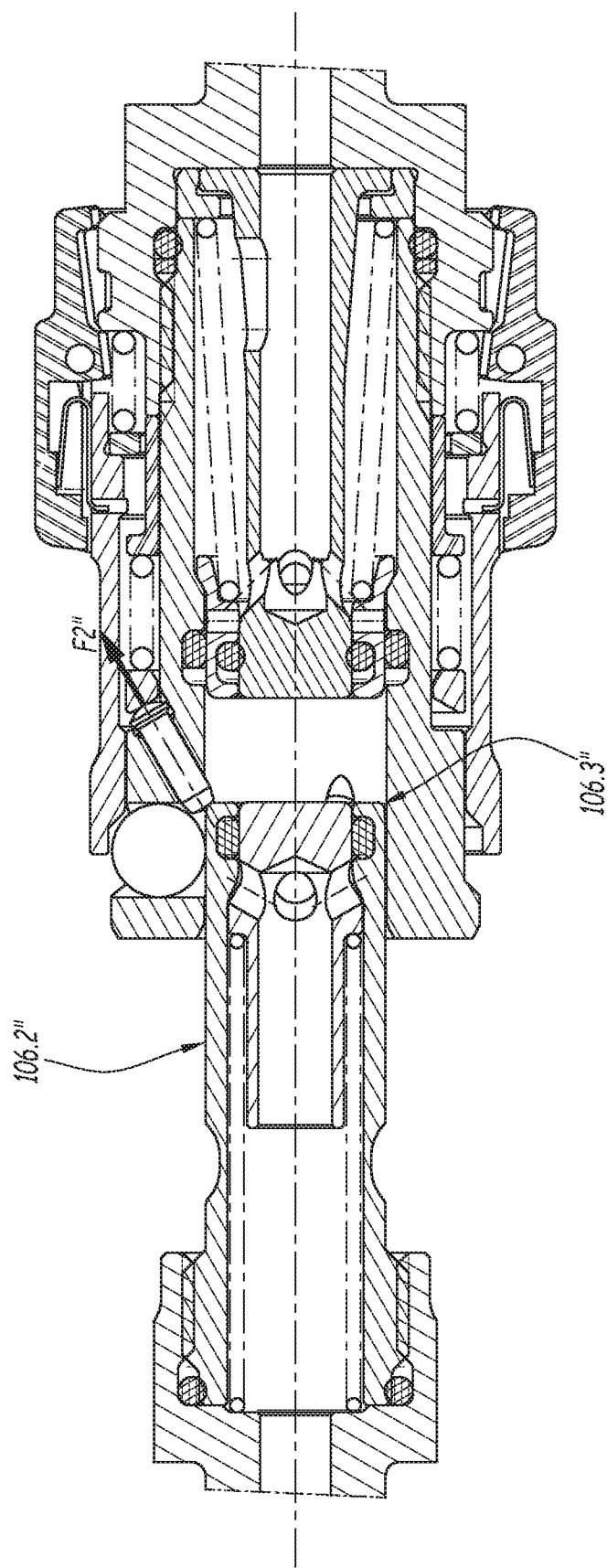

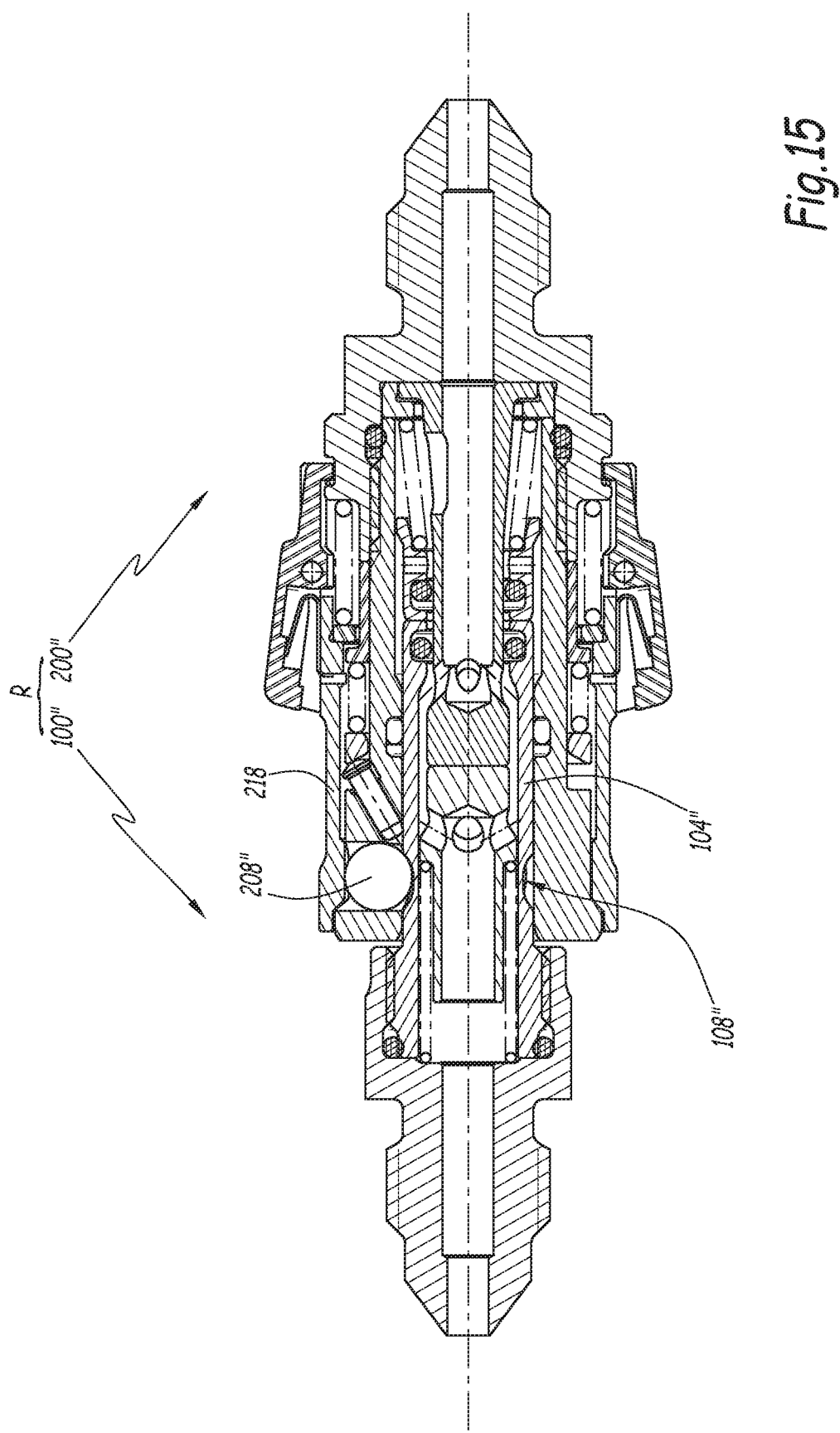

FEMALE COUPLING ELEMENT, TO BE COUPLED WITH A COMPLEMENTARY MALE ELEMENT AND COUPLING COMPRISING SUCH A FEMALE ELEMENT

In the field of couplings, it is known that a coupling comprises a first coupling element, called male element or end piece, and a second coupling element, called female element. The male element comprises a body that is received inside a body of the female element.

The invention relates to a female coupling element, to be coupled with a complementary male element.

The invention also relates to a coupling comprising the female element and the complementary male element. The coupling according to the invention is suitable for removably joining two fluid passage pipes. It is in particular a so-called "quick" coupling, suitable for removably and securely connecting high-pressure pipes, in particular in the field of automotive sports. For example, the coupling can be used to connect a pipe of a vehicle to an outside supply source or two pieces of equipment on board the vehicle. It is suitable for any type of fluid, liquid or gas, and with any type of viscosity.

Document EP 2,048,425 A1 discloses a coupling with prongs in which the male element comprises a peripheral groove and in which the female element includes several prongs, which are resiliently outwardly deformed in contact with the body of the male element and which return to their position when they arrive across from the groove. The prongs then become jammed in the groove, which results in axially locking the male body with the female body. This type of coupling does not make it possible to obtain a reliable and secure connection for high-pressure pipes and in a vibrating environment, since the related stresses may cause the unhooking of the prongs and untimely unlocking of the coupling.

Document EP 2,669,560 A1 discloses an improved coupling version, in which the female element further comprises a ring, for keeping the locking balls in the locked position, and a memory element, movable between a distal position, in which it is able to keep the locking balls in the unlocked position, and a proximal position, in which it does not oppose the movement of the balls radially inward. The memory element is a drawer movable in a direction parallel to the coupling axis. Consequently, the travel of the memory element is necessarily significant, since it substantially corresponds to the travel necessary to couple the male element with the female element. This therefore requires providing a relatively long annular space within the female element. This construction is therefore relatively cumbersome both in the radial direction and the axial direction. This lack of compactness makes the coupling difficult to integrate into a congested environment, or at least difficult to maneuver in such an environment.

The invention more particularly aims to resolve these drawbacks by proposing a female coupling element that is more compact.

To that end, the invention relates to a female quick coupling element, for joining pressurized pipes, said female element being able to be coupled with a complementary male element and comprising:
 a hollow female body defining a central axis,
 locking members, each locking member being radially movable inside a corresponding radial opening of the female body between a locked position, in which it protrudes radially inside the female body, and an unlocked position, in which it is further from the central axis than in the locked position,
 at least one memory element, movable along a movement axis between a distal position, in which it opposes the movement of a locking member from the unlocked position to the locked position, and a proximal position, in which it does not oppose the movement of the locking member from the unlocked position toward the locked position, and
 a locking ring, which is axially movable between a forward position, in which it keeps the locking members in the locked position, and a withdrawn position, in which it does not keep the locking members in the locked position.

According to the invention, each memory element is received in a housing defined in the thickness of the body, each memory element is, in the distal position, closer to the central axis than the locking members are in the unlocked position, and the movement axis of each memory element between the distal position and the proximal position is inclined relative to the central axis of the female body.

Owing to the invention, the travel of the memory element during coupling is reduced, since the memory element moves not parallel to the axis of the coupling, but rather inclined relative thereto. The female element is therefore more compact in the axial direction. Furthermore, the memory element is received in a housing defined in the thickness of the female body, such that it does not occupy a completely separate stage, such as a housing defined in an annular space that emerges visibly on the front face of the element. The female element is therefore also more compact in the radial direction. This increase in compactness has the advantage that the coupling can be installed in a confined space, while remaining easy to maneuver.

According to advantageous, but optional aspects of the invention, the female element may include one or more of the following features, considered in any technically allowable combination:
 When the locking ring is in an intermediate position, positioned axially between its forward position and its withdrawn position, at least one locking member in the unlocked position opposes a resilient return of the locking ring toward its forward position.
 The movement axis of each memory element between its distal position and its proximal position is inclined relative to the central axis by an angle comprised between 20° and 40°, preferably equal to 30°.
 The female element comprises a return means for returning each memory element to the distal position, this return means preferably comprising a spring, which is inserted radially between the female body and the locking ring.
 The return means comprises an annulus, which is axially movable between the female body and the locking ring and which is resiliently loaded against the memory element.
 Each memory element has a hemispherical head, configured to cooperate with the annulus.
 The locking members each have a noncircular section in a plane passing through the central axis.
 The female element comprises several memory elements distributed regularly around the central axis.
 Each memory element is a pin with a cylindrical portion whose generatrices are parallel to its movement axis.
 Each memory element comprises a heel, with a frustoconical shape and configured to bear against a bevel of the locking member.

The invention also relates to a coupling for removably joining two fluid passage pipes, this coupling comprising a female element as previously described and a complementary male element.

According to advantageous, but optional aspects of the invention, such a coupling may include one or more of the following features, considered in any technically allowable combination:

The male element includes a male body, which is able to push each memory element from its distal position toward its proximal position when it is received inside the female body and to cooperate with the locking members when they are in the locked position to prevent the axial removal of the male body outside the female body.

The male body includes a first surface able to push back each memory element to the proximal position and a second surface able to push back each locking member to the unlocked position, while the first surface and the second surface are alongside one another.

The first surface and the second surface belong to a relief of the male body, the relief preferably being a flange comprising a proximal wall, a distal wall forming the first surface and an apex forming the second surface and extending between the proximal wall and the distal wall.

During uncoupling, each memory element is returned to the distal position while the locking members are kept in the unlocked position by the second surface.

Figure 2:
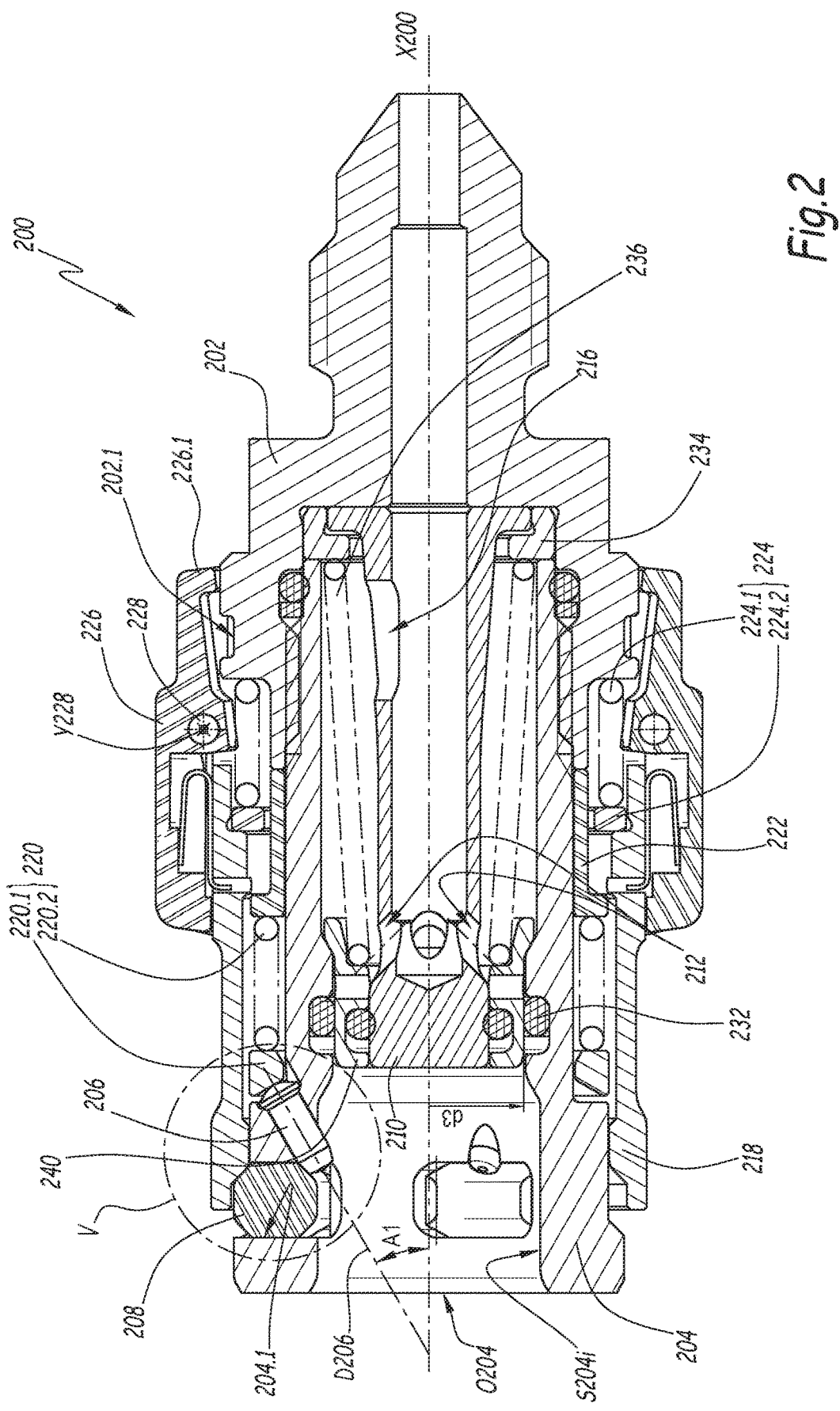
Figure 3:
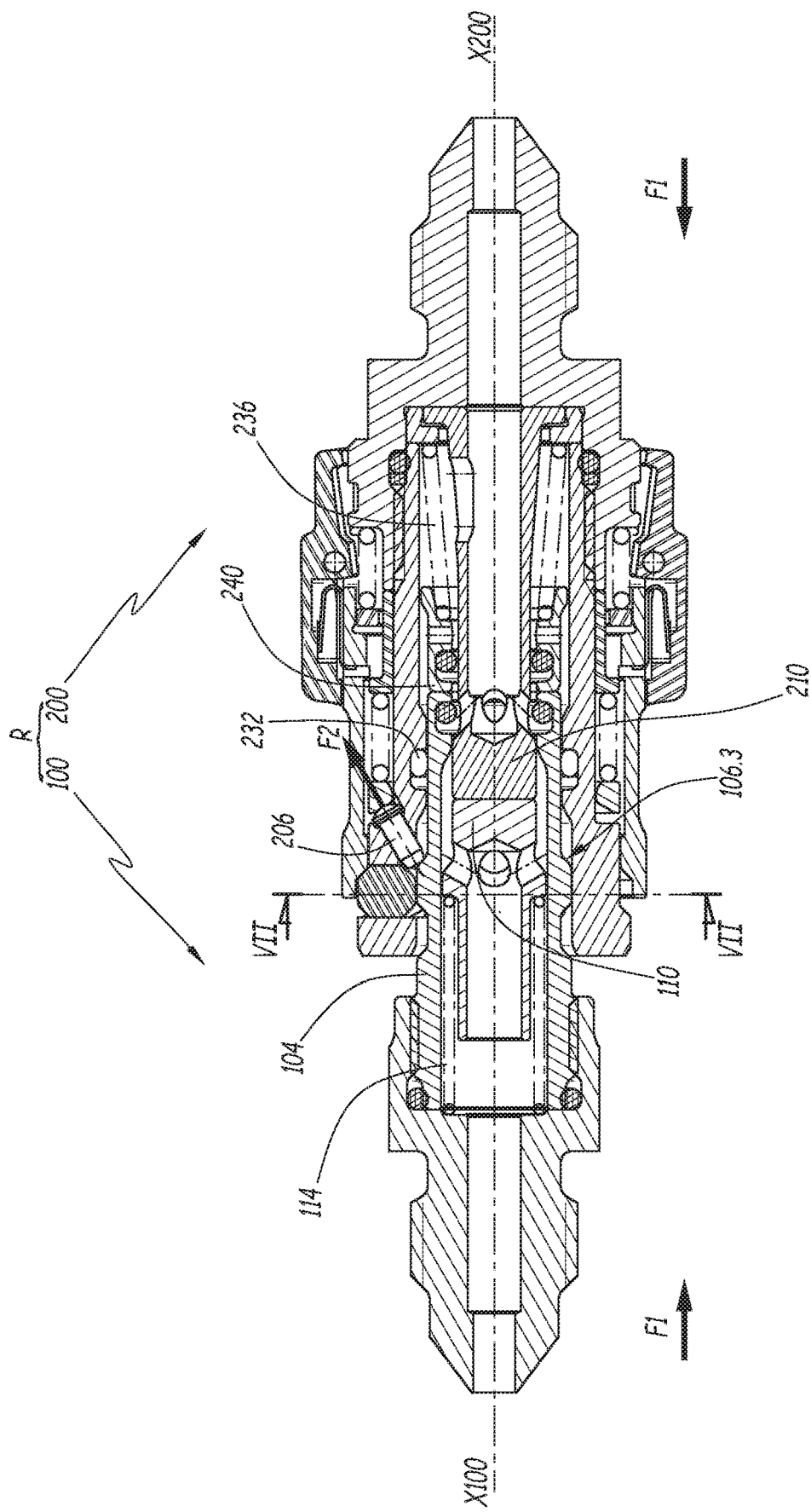
Figure 4:
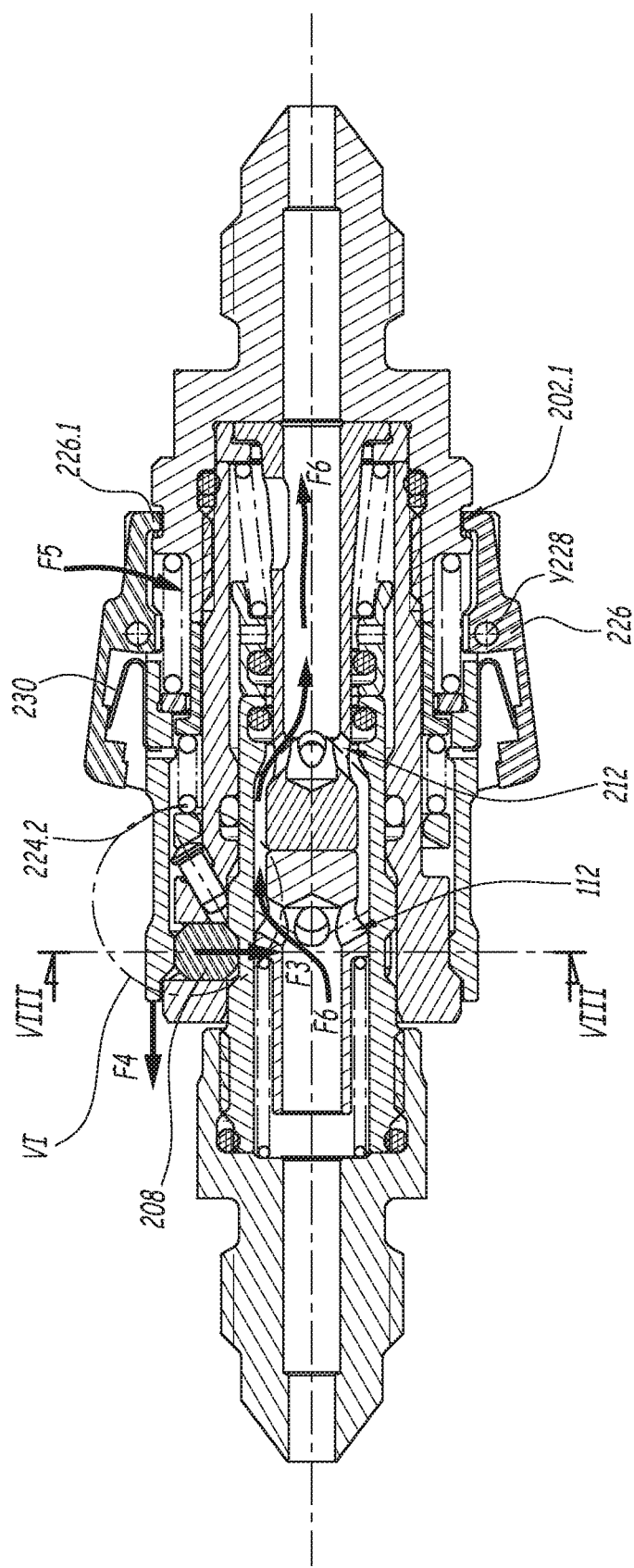
Figure 8:
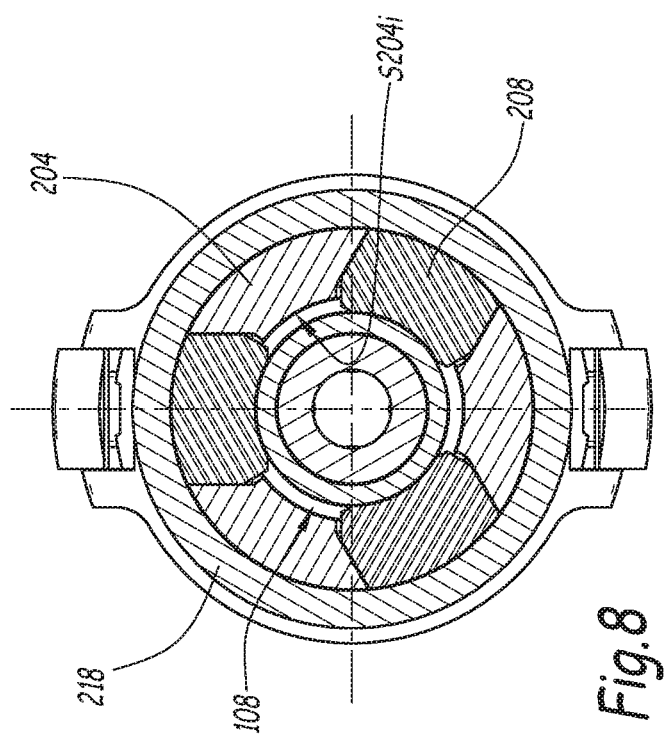
Figure 7:
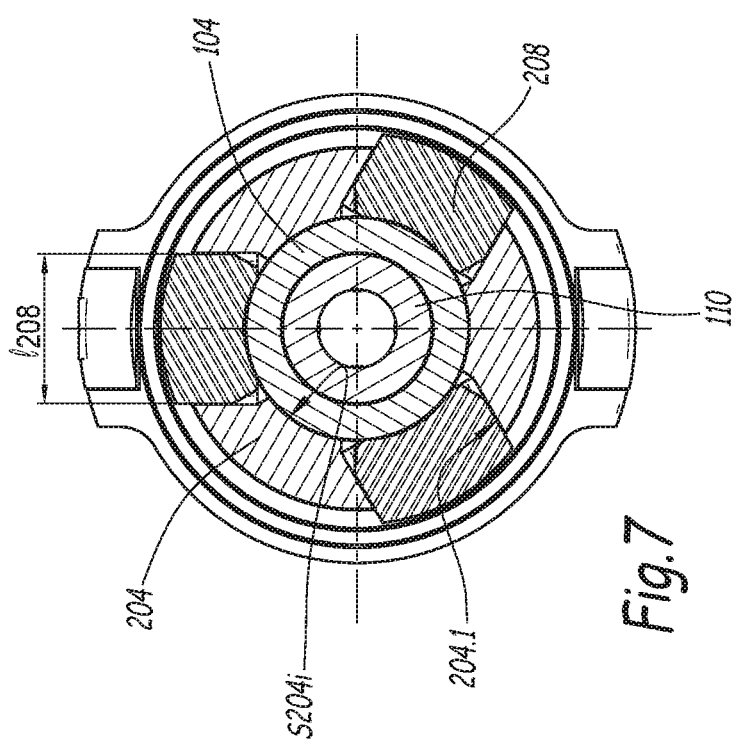
Figure 9:
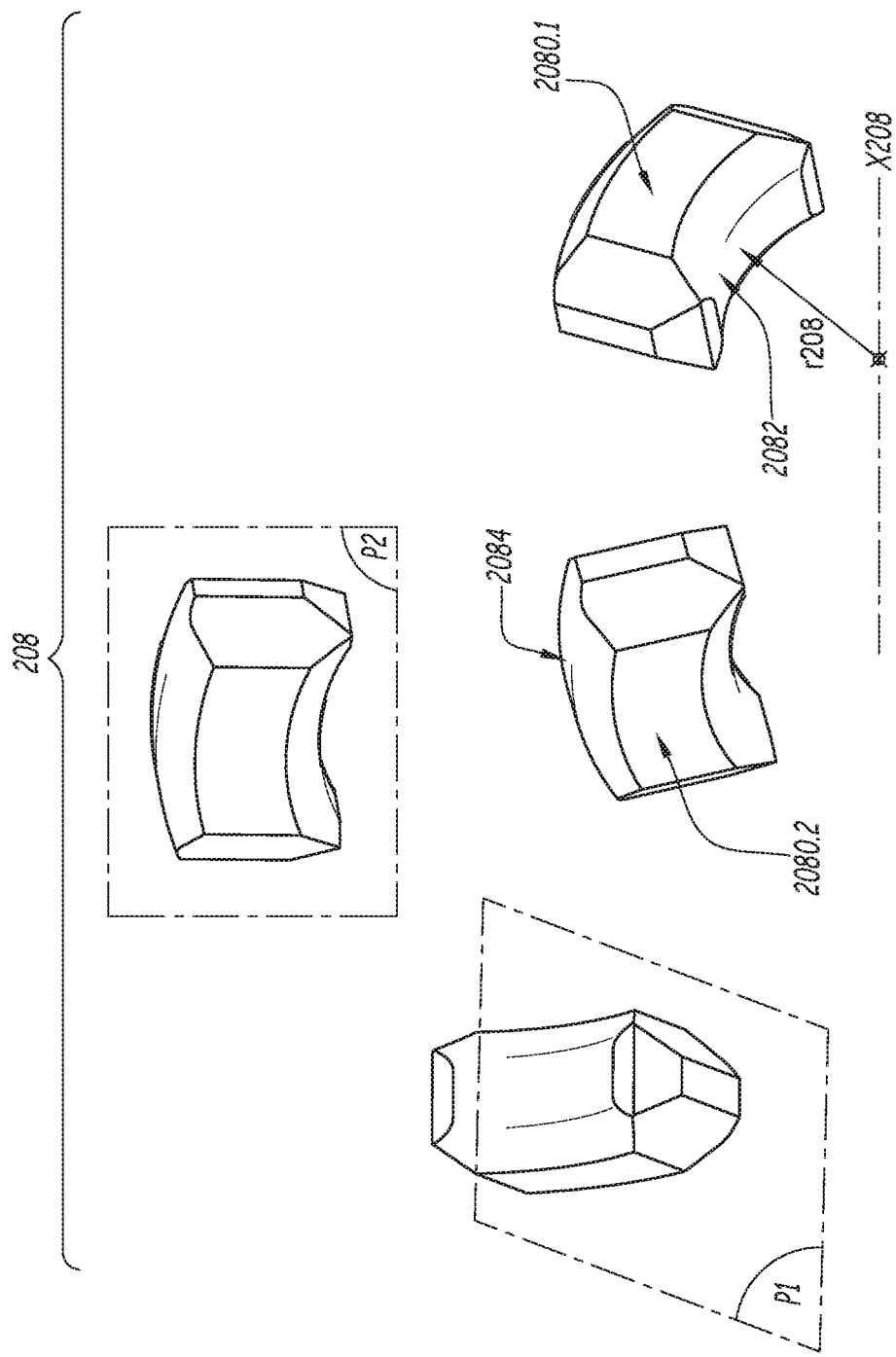
Figure 10:
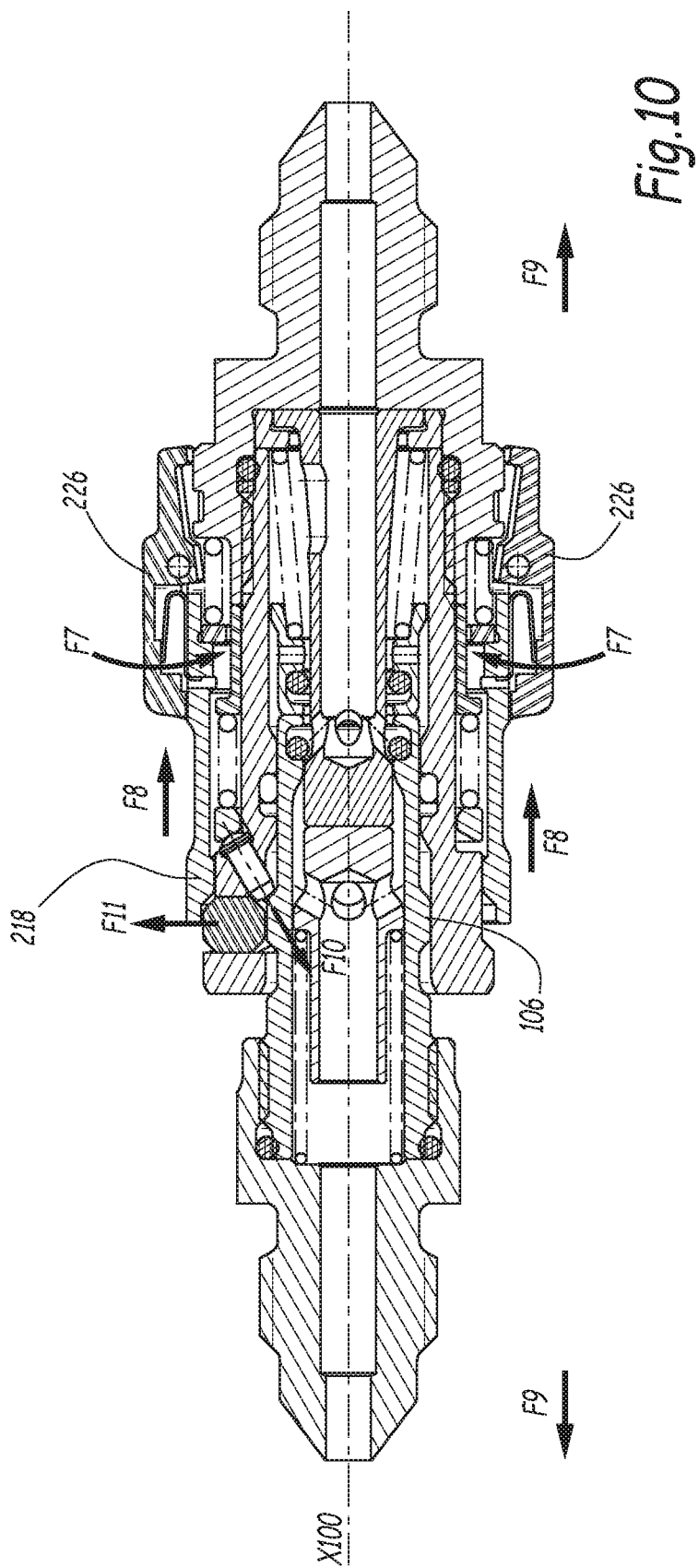
Figure 11:
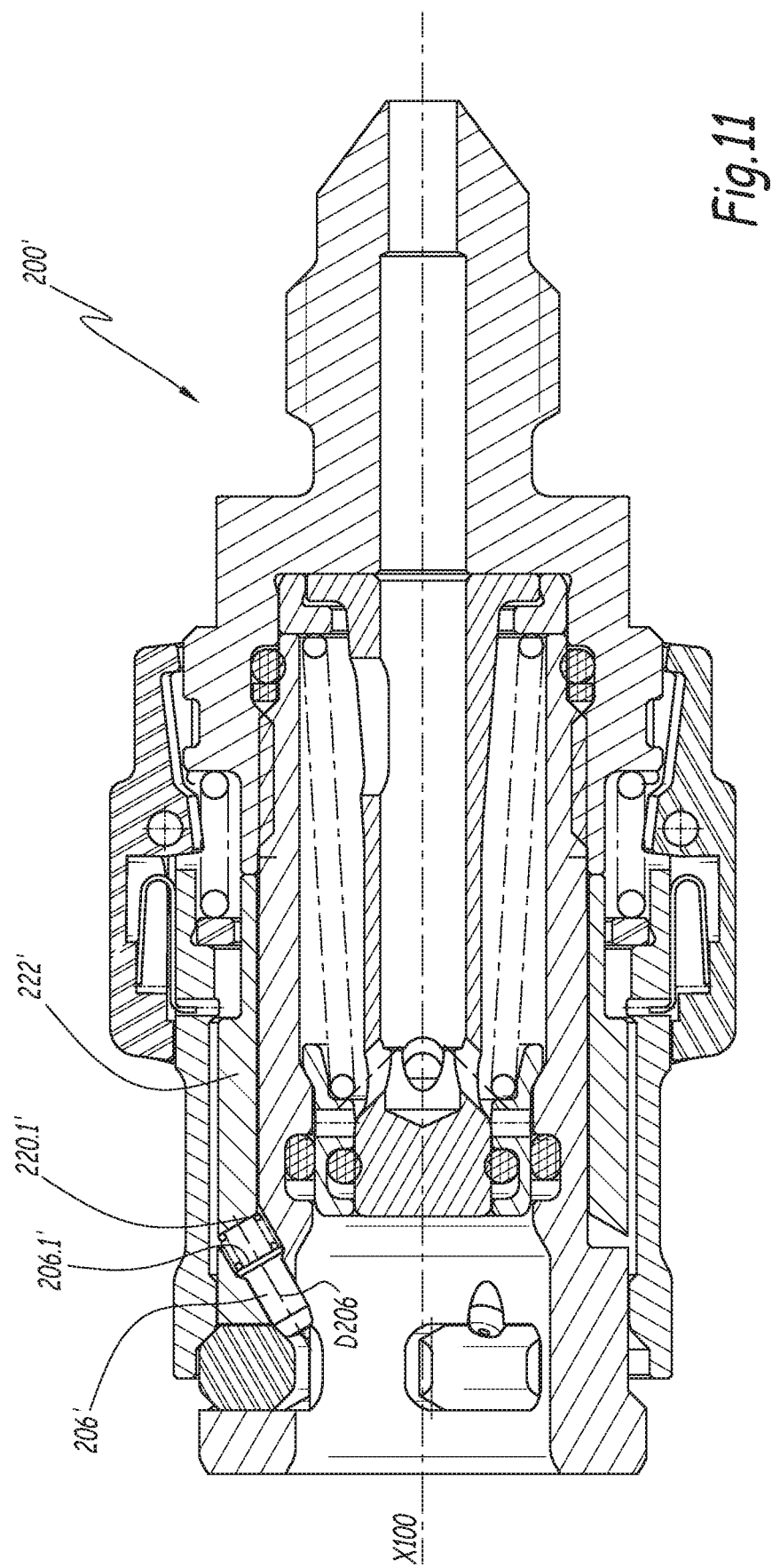
Figure 12:
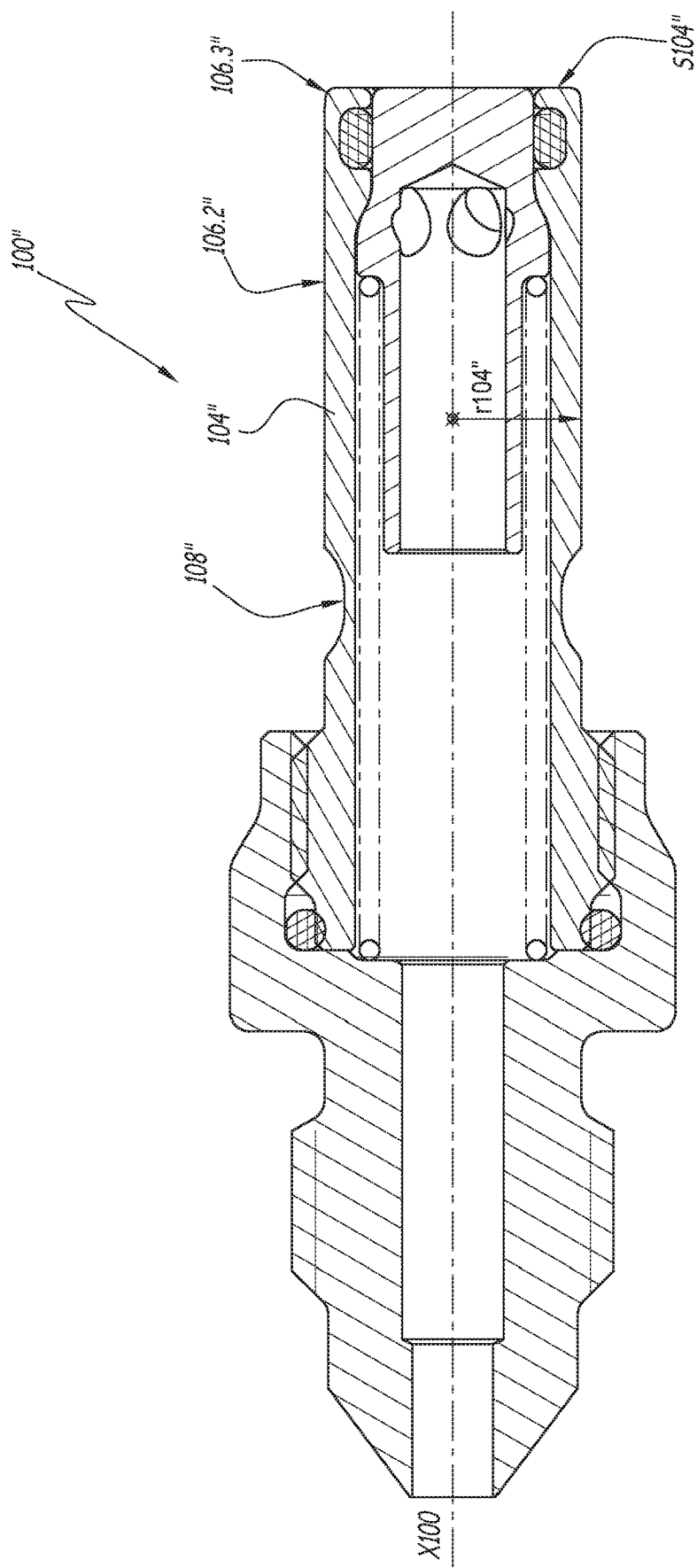
Figure 13:
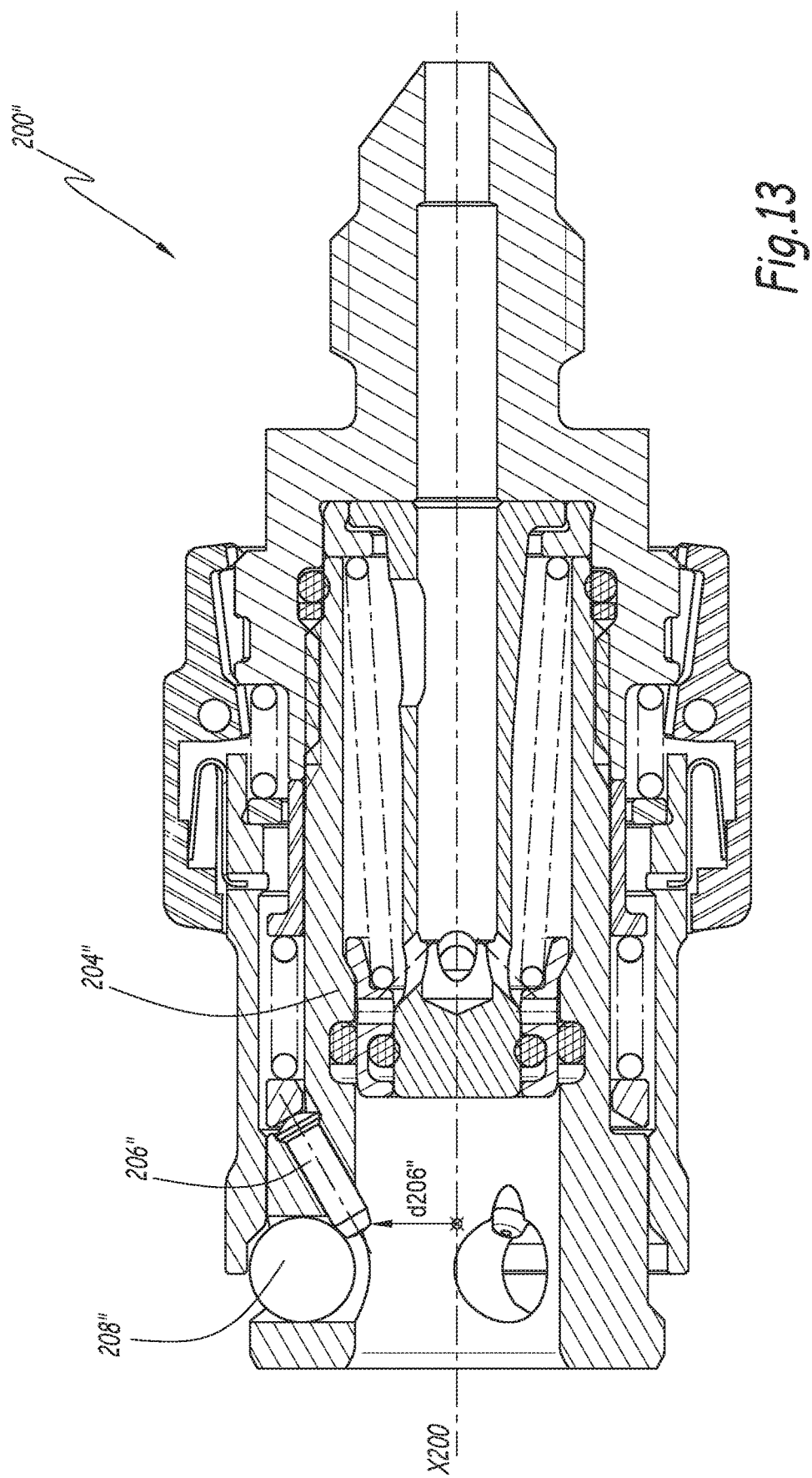

The invention and other advantages thereof will appear more clearly in light of the following description of three embodiments of a female element according to its principle, provided solely as an example and done in reference to the appended drawings, in which:

FIGS. 1 and 2 are longitudinal sectional views respectively showing a male element and a female element, in the uncoupled configuration, of a coupling according to a first embodiment of the invention, FIG. 3 is a longitudinal sectional view showing the male element and the female element in the coupling phase, FIG. 4 is a sectional view similar to FIG. 3, in which the male element and the female element are in the coupled configuration, FIGS. 5 and 6 are enlarged views of circle V in FIG. 2 and circle VI in FIG. 4, respectively, FIGS. 7 and 8 are cross-sections along line VII-VII of FIG. 2 and line VIII-VIII of FIG. 4, respectively, FIG. 9 shows several perspective views of a locking member belonging to the female element of FIGS. 2 to 4, FIG. 10 is a sectional view similar to FIGS. 3 and 4, showing the male and female elements in the uncoupling phase when the locking ring is pulled, FIG. 11 is a sectional view similar to FIG. 2, showing a female element according to a second embodiment of the invention, FIGS. 12 and 13 are longitudinal views comparable to FIGS. 1 and 2, but which show a male element and a female element belonging to a coupling according to a third embodiment of the invention, FIG. 14 is a sectional view similar to FIG. 3, showing the male element and the female element in the coupling phase, FIG. 15 is a sectional view similar to FIG. 4, showing the male element and the female element in the coupled configuration.

FIGS. 3, 4 and 10 show a coupling R for removably joining fluid passage pipes (not shown), with a pressure that may reach up to 300 bars. The coupling R comprises a first coupling element 100, which, in the considered field, is described as male element or end piece, and a second coupling element 200, which is a female element. The male and female elements 100 and 200, respectively, are intended to be coupled to one another to ensure a fluid communication between the two pipes to be coupled.

The male element 100 is shown alone in FIG. 1. As shown in this figure, the male element 100 extends along a central axis X100. It comprises a male body 104, which is screwed inside a male adapter body 102. The male adapter body 102 is configured to be coupled with one end of a flexible or rigid pipe (not shown). Within the meaning of the invention, an outlet of a piece of equipment, such as a pump or a reservoir, can also be considered a pipe.

In the rest of the description, an "axial" direction refers to a direction parallel to a coupling axis of the coupling R, and a "radial" direction defines a direction perpendicular and secant to the coupling axis of the coupling R. Furthermore, the adjective "distal" or "forward" used in connection with a coupling element from among the elements 100 and 200 refers to an axial direction oriented toward the complementary coupling element during the coupling phase, the adjective "proximal" or "rear" being used to refer to an axial direction oriented on the side opposite the complementary coupling element during the coupling phase, i.e., oriented on the side of the pipe to which the coupling element is connected.

The male body 104 is hollow, i.e., it has a tubular shape centered on the axis X100. It comprises an outer housing 108, delimited on the outer peripheral surface of the body 104. In the example, the housing 108 is a peripheral groove.

The male body 104 also comprises, on its outer peripheral surface, a relief 106, which is arranged distally relative to the housing 108. The relief 106 is a part protruding outward relative to the outer radial surface of the body 104. Advantageously, the relief 106 is an annular flange comprising a proximal wall 106.1, a distal wall 106.3 and an apex 106.2 extending between the walls 106.1 and 106.3. In the example, the walls 106.1 and 106.3 are frustoconical surfaces centered on the axis X100, while the apex 106.2 is a cylindrical surface also centered on the axis X100. The walls 106.2 and 106.3 are alongside one another, i.e., they delimit a shared edge, where their profiles are combined in a rounding or a shared hollow.

A gate 110 is axially movable inside the male body 104. More specifically, the gate 110 is translatable between a closed position, or uncoupled position, in which it prevents the fluid flowing in the pipe connected to the male adapter body 102 from crossing the coupling element 100, and an open position, or coupled position, in which it does not oppose the passage of the fluid through the coupling R.

The gate 110 is elastically charged in the closed position by a return means 114, which, in the example, is a helical spring centered on the axis X100. The spring 114 is inserted between a shoulder of the gate 110 and a shoulder of the male adapter body 102.

The gate 110 delimits at least one, preferably several openings 112, which allow the fluid to flow around the gate 110 when the latter is pushed backward against the resilient force of the spring 114. The openings 112 are defined in the thickness of the gate 110, i.e., they extend in a manner not parallel to the axis X100.

The female element 200 is shown alone in FIG. 2. As shown in this figure, the female element 200 extends along a central axis X200. The female element 200 comprises a female body 204, which is screwed inside a female adapter body 202. The female adapter body 202 is provided to be coupled with one end of a flexible or rigid pipe (not shown).

The female body 204 is hollow, i.e., it has a tubular shape centered on the axis X200. It comprises an inner radial surface S204i defining a central cavity O204 forming a mouth for receiving the male body 104. The female body 204 delimits several radial openings 204.1 that each receive a corresponding locking member 208. The radial openings 204.1 are defined in the thickness of the female body 204. In the example, the female body 204 comprises three radial openings 204.1.

The female body 204 also delimits at least one housing 204.2, inside which a memory element 206 is received. Each housing 204.2 is arranged proximally relative to the openings 204.1. Each housing 204.2 is defined in the thickness of the female body 204. This means that each housing 204.2 extends between the inner part of the female body 204, i.e., the central cavity, and the outside of the female body. In other words, each housing 204.2 traverses the female body 204 along a direction not parallel to the axis X200.

In the example, each housing 204.2 is a through hole, i.e., a hole that emerges inside the female body 204 on one side, i.e., in the receiving mouth O204, and outside the female body 204 on the other side.

In the example of the figures, the female element 200 comprises three locking members 208 and three corresponding memory elements 206. The female body 204 therefore has three housings 204.2.

The radial openings 204.1 are advantageously distributed regularly around the axis X200. Likewise, the housings 204.2 are also distributed regularly around the axis X200.

Each locking member 208 is radially movable inside a corresponding radial opening 204.1 between a locked position, in which it protrudes radially inside the female body 204, i.e., inside the mouth O204 formed by the female body 204 in the front, and an unlocked position, in which it is further from the central axis X200 than in the locked position. This means that, when the locking members 208 are moved from their locked position to their unlocked position, each locking member 208 retracts radially to penetrate its opening 204.1, even more than in the locked position.

Preferably, each locking member 208 does not protrude radially inside the female body 204 when it is in the unlocked position. However, alternatively, each locking member 208 could protrude radially inside the female body 204 even in the unlocked position and without limiting the possibility of inserting or removing the male element in or from the mouth O204 of the female body.

In the locked position, each locking member 208 is positioned and kept protruding relative to the inner radial surface S204i of the female body 204.

All of the locking members 208 are identical, which is why only one of the locking members 208 is described below.

The locking member 208 is a ring segment, which extends along a peripheral direction relative to the axis X200. The locking member 208 therefore has a curve axis X208 and a curve radius r208. It has two orthogonal planes of symmetry P1 and P2, respectively. The plane of symmetry P2 is perpendicular to the curve axis X208, while the plane of symmetry P1 passes through the curve axis X208.

The locking member 208 has a noncircular section in a plane passing through the central axis X200, i.e., for example in the plane of FIGS. 2, 5 and 6. Indeed, the section of each locking member 208 in this plane is polygonal, i.e., it comprises several corners. In particular, the locking member 208 comprises two opposite surfaces 2080.1 and 2080.2 that are perpendicular to the axis X200 when the locking members 208 are positioned inside the openings 204.1. The surface 2080.1 is positioned on the proximal side, and the surface 2080.2 is positioned on the distal side. The locking member 208 also comprises an inner radial surface 2082 and an outer radial surface 2084.

Advantageously, the locking member 208 comprises a bevel 2086.1 that connects the outer radial surface 2084 to the proximal axial surface 2080.1.

Additionally, the locking member 208 comprises a bevel 2088.1 that connects the outer radial surface 2082 to the proximal axial surface 2080.1. Preferably, the locking member 208 also comprises a bevel 2088.2 that connects the inner radial surface 2082 to the distal axial surface 2080.2.

In the example, the bevels 2086.1, 2088.1 and 2088.2 each extend at 45° relative to the surfaces for which they provide the junction.

As shown in FIG. 7, each locking member has a length 1208, which is 5 mm in the example. The length 1208 is measured along an axis perpendicular to the plane of symmetry P1. As shown in FIG. 6, each locking member has a maximum thickness e208 of 2.1 mm and minimum thickness of 1.6 mm. In particular, this minimum thickness is on the side of the inner radial surface 2082. The thickness of the locking member 208 is measured perpendicular to the plane of symmetry P2.

Each memory element 206 is movable along a movement axis D206 between a distal position, in which it opposes the movement of the locking member 208 from the unlocked position toward the locked position, and a proximal position, in which it does not oppose the movement of the locking member 208 from the unlocked position toward the locked position. More specifically, in the distal position, each memory element 206 is able to keep only one of the locking members 208 in the unlocked position such that each memory element opposes the movement of the locking members 208 toward their locked position, and in the proximal position, the memory elements 206 are no longer in contact with the locking members 208. Each memory element 206 moves toward the rear when it goes from the distal position to the proximal position.

In the example, each memory element 206 is a pin with a cylindrical portion whose generatrices are parallel to its movement axis D206.

As shown in FIGS. 5 and 6, the pin 106 comprises a cylindrical central portion and two longitudinal ends respectively formed by a hemispherical head 206.1 and a frustoconical heel 206.2. In the example, the frustoconical heel 206.2 has an incline angle of about 15°. The heel 206.2 is configured to bear, in the uncoupled configuration, against the proximal bevel 2088.1 of a corresponding locking member 208, so as to keep the locking member 208 in the unlocked position. Preferably, the diameter of the central part of each pin 106 is about 1.2 mm.

Advantageously, the frustoconical heel 206.2 of each memory element 206 defines linear contact with the bevel 2088.1 of the locking member 208 when it bears with the latter.

Each memory element 206 protrudes inside the female body 204 when it is in the distal position. Preferably, each memory element 206 does not protrude inside the female body 204 when it is in the proximal position. However, in an alternative that is not shown, it is possible to imagine a configuration in which each memory element 206 would protrude radially inside the female body 204 even in the proximal position. In the distal position, each memory element 206 is accessible to the body 104 of the male element 100, i.e., is able to cooperate with the body 104 of the male element 100. More specifically, each memory element 206 comes into contact with and is pushed back by the male element 100.

The movement axis D206 of each memory element 206 is inclined relative to the central axis X200 of the female body 204. Preferably, the movement axis D206 and the central axis X200 are secant.

Advantageously, the movement axis D206 of each memory element 206 is inclined relative to the central axis X200 by an angle A1 comprised between 20° and 40°, preferably equal to 30°. The travel of each memory element 206 depends on the incline of the movement axis D206 relative to the central axis X200. It is comprised between 0.5 mm and 5 mm, in the example equal to 1.2 mm.

Optionally, the female element 200 comprises a return means 220 for returning the memory elements 206 to the distal position. In the example, this return means 220 comprises an annulus 220.1 and a single spring 220.2. Having a single spring to return the memory elements 206 to the distal position advantageously reduces the risk of jamming one or several of the memory elements 206 and ensures a good distribution of forces. The annulus 220.1 is cleverly used to recall all of the memory elements 206 together and simultaneously. The spring 220.2 is inserted between the annulus 220.1 and a bearing ring 222, which abuts axially against the female adapter body 202.

The annulus 220.1 is axially movable around the female body 204. In the example, the annulus 220.1 is mounted around the female body 204 with a radial play of about 0.1 mm. The annulus 220.1 is centered on the axis X200 and is resiliently loaded against each memory element 206. In particular, the annulus 220.1 cooperates with a hemispherical head 206.2 of the memory element 206 when the memory element is returned to the distal position by bearing and sliding of their respective contact surfaces. In particular, the annulus 220.1 delimits a contact surface 220.10 with the hemispherical head 206.1 that is substantially perpendicular to the movement axis D206 of the pin 206. The incline angle of the surface 220.10 relative to the axis X200 is therefore identical to the incline angle of the axis D206 relative to the axis X200. This angle is therefore 30° in the example of the figures.

The female element 200 also comprises a locking ring 218, which is axially movable around the female body 204. The return means 220 is advantageously inserted radially between the female body 204 and the locking ring 218.

The locking ring 218 is movable between a forward position, in which it keeps the locking members 208 in the locked position, and a withdrawn position, in which it does not keep the locking members in the locked position. In the uncoupled configuration of the coupling R, the locking ring 218 remains in an intermediate position, which is situated axially in the travel of the ring 218 between the withdrawn and forward positions, and in which it is resiliently loaded against the locking members 208, when the latter are in the unlocked position, the locking members 208 then opposing the return of the blocking ring 218 to its forward position. In the example, the blocking ring 218 is resiliently loaded against the locking members 208 by a return means 224. This return means 224 advantageously comprises an annulus 224.1 and a spring 224.2. The annulus 224.1 is resiliently loaded by the spring 224.2 in the forward direction. It cooperates with an inner radial shoulder of the blocking ring 218. The spring 224.2 is axially inserted between the female end piece body 202 and the annulus 224.1. This resilient loading allows an automatic return of the blocking ring 218 from its intermediate position toward its forward position upon coupling, and is advantageous to have an automatic coupling that connects easily by simply approaching its two coupling ends along the coupling axis.

The return means is arranged radially between the bearing ring 222 and the locking ring 218. In this way, the operation of the return means 224 does not interfere with that of the return means 220.

Preferably, the locking ring 218 comprises a peripheral inner bevel 218.1 intended to cooperate, during coupling, by bearing with the proximal bevel 2086.1 of the locking members 208 when at least one of the locking members 208 is kept in the unlocked position and protrudes radially outside the female body 204.

Optionally, the female element 200 also includes two diametrically opposite levers 226. The two levers 226 are each mounted articulated around a rotation axis Y228 defined by a pin 228. The pin 228 is part of the locking ring 218. The axis Y228 is orthoradial, i.e., perpendicular to an axis radial with respect to the axis X200. The two levers 226 each include a heel 226.1 intended to be engaged, in the coupled state, inside a peripheral groove 236 arranged on the outside of the female adapter body 202. The two levers 226 are mounted behind the locking ring 218 and are connected in translation to the ring 218. These two levers 226 are configured to oppose the withdrawal of the ring 218 when the coupling R is in the coupled configuration.

A U-shaped spring leaf 230 is inserted radially between each lever 226 and the locking ring 218. Owing to these spring leaves 230, the levers 226 automatically switch toward their locking position when the coupling reaches the coupled position. Each spring leaf 230 comprises an end engaged radially in a radial hole formed in the ring 218.

Advantageously, the female element 200 comprises a fluid passage and a drawer 240, which is axially movable inside the female body 204 between an open position and a closed position of the passage. The closed position is a forward, or distal, position, while the open position is a withdrawn, or proximal, position. The drawer 240 is resiliently loaded in the forward direction by a spring 236 inserted between an inner radial shoulder of the drawer 240 and a bearing part 234 positioned against an inner radial shoulder of the female adapter body 202 of the female element 200.

Preferably, the female element 200 also comprises a stationary piston 210, which is positioned inside the drawer 240 and which is able to push, during coupling, the gate 110 of the male element 100. The fixed piston 210 comprises a central cavity and delimits at least one, preferably several openings 212, which are formed in the thickness of the piston 210 and which allow the fluid flowing around the piston 210 to reach the central cavity thereof. The fluid can next reach the pipe connected to the female adapter body 202.

In the example, the front end faces of the piston 210 and the drawer 240 are flush, i.e., coplanar, when the female element 200 is in an uncoupled configuration, which makes it possible to limit leaks upon coupling. This is possible because the drawer 240 does not serve to keep the locking members 208 in the unlocked position, like in EP 2,669,560 A1.

Advantageously, the piston 210 also comprises a radial opening 216, behind the openings 212. This radial opening 216 has the advantage of facilitating the movement of the drawer 240 upon coupling, and therefore limiting the axial forces necessary to couple the coupling.

In the closed position, the drawer 240 cooperates with a gasket 232 received in an inner peripheral groove of the female body 204. The gasket 232 is closer to the central axis X200 than the memory element 206 is when it is in the distal position. In other words, the minimum distance d3 between the gasket 232 and the axis X200, which corresponds to half of what is called the "sealing diameter", is smaller than the minimum distance d206, shown in FIG. 5, between each memory element 206, in the distal position, and the central axis X200. Additionally, the distance d3 is smaller than the minimum distance d208 between any one of the locking members 208 and the axis X200.

The central cavity O204 of the female body 204, which receives the male body 104, is therefore wider in the front. The receiving mouth of the male body 104 narrows at the receiving groove of the gasket 232. This makes it possible to limit the risk of the front portion of the male body 104, i.e., the portion positioned in front of the flange 106, from coming into contact with the locking members 208 and with the memory elements 206. In particular, this makes it possible that if the body 104 is introduced coaxially inside the female body 204, then the cylindrical portion positioned in front of the flange 160 does not touch the parts 208 and 206.

As shown in FIG. 5, in the distal position, each memory element 206 is closer to the central axis X200 than the locking members 208 are when they are in the unlocked position. In other words, the minimum distance d206 between each memory element 206, in the distal position, and the axis X200 is smaller than the minimum distance d208 between each of the locking members 208, in the unlocked position, and the axis X200.

In the uncoupled configuration, the drawer 240 is in the closed position and closes off the fluid passage. The locking ring 218 is resiliently loaded in the forward direction under the resilient force of the spring 224.2, in the intermediate position where it is abutting against the locking members 208. The annulus 220.1 is resiliently loaded in the forward direction and keeps each of the memory elements 206 in the distal position. The heel 206.2 of each memory element 206 acts on a corresponding locking member 208 to keep the latter in the unlocked position, which consequently keeps the locking ring 218 in the intermediate position.

The coupling sequence of the male element 100 with the female element 200 is described below in relation to FIGS. 3 and 4.

The first step of the coupling consists of positioning the elements 100 and 200 across from one another and bringing them closer to one another, as shown by arrows F1 in FIG. 3. The male body 104 is then received inside the female body 204. At this stage, the axes X100 and X200 are combined along a same axis, which forms a coupling axis of the coupling R. By penetrating the female body 204, the male body 104 pushes the drawer 240 backward, against the resilient force exerted by the spring 236. At the same time, the stationary piston 210 of the female element 200 pushes the moving gate 110 of the male element 100 back in the rear direction, against the resilient force exerted by the spring 114. Advantageously, the outer radius r104 of the front end of the male body 104 is smaller than the distance d206 between any one of the memory elements 206, in the distal position, and the axis X200. Thus, the front end of the male body 104 does not come into contact with the memory elements 206 when the body 104 is inserted inside the body 204.

Conversely, the flange 106 has a radius r106 larger than the minimum distance d206 between any one of the memory elements 206, in the distal position, and the central axis X200. Thus, continuing the movement causes the relief 106 of the male body 104 to come into contact with each memory element 206. More specifically, the surface 106.3 of the flange 106 abuts against the frustoconical heel 206.2 of the memory elements 206. Having several memory elements 206 and a return means 200 shared by all of the memory elements 206 has the advantage that if the male body 104 is inserted sideways inside the female body 204 and pushes against only one of the memory elements, then the annulus 220.1 becomes inclined relative to the axis X200 and places itself in a braced configuration around the female body 204. In this configuration, the annulus 220.1 is immobilized in translation around the female body 204 and opposes the movement of the other memory elements 206 in the proximal position.

At the same time, the male body 104 bears against the inner bore of the female body 204, in particular at the gasket 232. The coupling R is then in the configuration of FIG. 3.

By pushing the male body 104 further into the female body 204, the locking members 208 exceed the flange 106 and each memory element 106 is pushed from its distal position toward its proximal position by the surface 106.3 of the flange 106, as shown by arrow F2 in FIG. 3. The annulus 220.1 withdraws and the spring 220.2 is compressed. Each memory element 206 is next kept in the proximal position by the apical surface 106.2 of the relief 106. This maintenance is obtained due to the fact that the walls 106.2 and 106.3 are alongside one another. The fact that the memory pins 206 enter the proximal position makes it possible to free the movement of the locking members 208 in the radial direction. Each locking member 208 can therefore be pushed back in the unlocked position by the apical surface 106.2.

When the locking members 208 more precisely arrive around the peripheral groove 108 of the male body 104, they are pushed radially inward by the locking ring 218. Indeed, the locking ring 218 is resiliently loaded in the forward direction by the return means 224. It therefore exerts, by corner effect, a force directed centripetally on the locking members 208. This radial force comes from the complementary surface between the inner peripheral bevel 218.1 formed at the forward end of the locking ring 218 and the proximal bevel 2086.1 of the locking members 208.

Under the action of the ring 218, the locking members 208 fall radially inside the peripheral groove 108, as shown by arrow F3 in FIG. 4. At the same time, the locking ring 218 moves in the direction F4 under the resilient return force of the spring 224.2. The ring 218 then reaches a forward, or overlapping, position in which it keeps the locking members 208 in the locked position inside the groove 108. Owing to this ring 218, the locking members 208 are not able to leave the groove 108 under the effect of the internal pressure of the fluid, vibrations or any other mechanical stress. In the forward position, the ring 218 optionally abuts against part of the female body 204.

The levers 226 follow the axial movement of the ring 218, i.e., move jointly with the ring 218 in the forward position. The heel 226.1 of each lever 226 then arrives across from the groove 202.1 defined in the female adapter body 202 and each lever 226 tilts in the direction F5 under the resilient action of the spring leaf 230. The levers 226 are then attached to the adapter body 202, such that they prevent, with the exception of any axial play, any axial movement of the ring 218.

The movable drawer 240 is withdrawn enough to free the passage of the fluid through the openings 212 of the stationary piston 210 and the fluid can flow through the coupling R, as shown by arrows F6 in FIG. 4. The coupling R is coupled.

Particularly advantageously, the coupling of the male and female elements of the coupling R is done automatically, i.e., by simply bringing the two coupling elements closer to one another.

In the coupled configuration, the male body 104 is axially locked with the female body 204 owing to the cooperation of the locking elements 208 with the peripheral groove 108 of the male body 104. More specifically, this axial locking is obtained owing to the cooperation of the proximal bevel 2088.1 of the locking members 208 with the proximal wall 106.1 of the flange 106, this wall 106.1 forming a mechanical stop upon withdrawal of the female body 204. Indeed, the outer radius r106 of the flange 106 is naturally larger than the distance d208' that separates each locking segment 208, then in the locked position, and the central axis X200. Conversely, a distal surface of the male adapter body 102 offers a contact stop for a distal surface of the female body 204 in order to further limit the approach of the two male and female elements by fitting. The coupling of the coupling is locked such that the relative fitting position of the two coupling elements is blocked, or greatly limited.

In the example, the surfaces 106.1 and 2088 do not have the same incline relative to the coupling axis of the coupling R. Consequently, the contract between the locking members 208 and the male body 104 is not a periodic contact, but a linear contact, and the contact line between the locking members 208 and the male body 104 extends peripherally around the coupling axis. This makes it possible to avoid localized plastic deformations, or upsetting, of the male body 104 over the long term, since the axial forces between the members 208 and the male body 104 are distributed on a line, and not localized at a specific point.

To disconnect the coupling R, two operations should be carried out at the same time, as shown in FIG. 10. The first operation consists of tilting the levers 226 against the resilient force exerted by the spring leaves 230 so as to dislodge the heel 226.1 of each lever 226 outside the peripheral groove 236 defined on the periphery of the female adapter body 202 of the female element 200. This operation therefore makes it possible to free the axial movement of the locking ring 218. The second operation consists of withdrawing the ring 218 toward its withdrawn position, against the resilient force exerted by the spring 224.2, to expose the locking members 208. The ring 218 abuts axially against a part, which is not visible, of the female adapter body 202. These two operations can be carried out at the same time and with one hand, by grasping the rear of the levers 226, and optionally the ring 218. The withdrawal of the locking ring 218 makes it possible to free the radial movement of the locking members 208. Once these two operations have been carried out, the uncoupling of the coupling R is obtained easily by moving the male and female elements away from one another, as shown by arrows F9 in FIG. 10.

More specifically, when one pulls on the male body 104 on the side opposite the female element 200, the locking members 208 are pushed radially outward, by corner effect due to the incline of the surfaces 106.1 and 2088.1 of the male flange 106 and the locking members 208, respectively. The specific incline of the surfaces 106.1 and 2088.1 makes it possible to facilitate the movement of the locking members 208, i.e., to obtain a movement without snags, and to avoid jamming the assembly, i.e., to prevent the coupling from being unable to be uncoupled again.

The locking members 208 go from their locked position to their unlocked position. In this position, they no longer oppose the removal of the male body 100 for outside the female body 204. The locking members 208 are kept in the unlocked position by the apical surface 106.2 of the relief 106, against the return force from the ring 218, until the memory elements 206 are resiliently returned from their proximal position toward the distal position. Indeed, the outer radius r106 of the flange 106 is large enough to keep the locking members 208 far enough away from the axis X200 and thus to allow each memory element 206 to return to the distal position, each memory element 206 emerging from the front side of the relief 106. Each memory element 206 is therefore returned to the distal position while the locking members 208 are still kept in the unlocked position by the apical surface 106.2. This sequencing in terms of movement is advantageously obtained due to the fact that the walls 106.2 and 106.3 of the flange 106 are alongside one another.

More specifically, the resilient force exerted by the spring 220.2 is transmitted to the annulus 220.1, which cooperates with the hemispherical head 206.1 of each memory element 206 by contact and sliding, to push the memory element 206 in the direction of the axis D206, and inward. The transmission of forces between the annulus 220.1 and the memory elements is optimized due to the presence of the inclined surface 220.10 delimited by the annulus 220.1. Upon returning to the distal position, each memory element 206 keeps a corresponding locking member 208 in the unlocked position, the locking members 208 keeping the locking ring 218 in its intermediate position once the latter has been released. The ring 218 remains resiliently loaded by the spring 224.2 in the intermediate position.

Lastly, the removal of the male element causes the gate 110 and the drawer 140 to return to the closed position, which results in cutting off the fluid communication between the two coupling elements. The coupling R is uncoupled.

FIG. 11 shows a female element 200' according to a second embodiment of the invention. Below, only the differences with respect to the first embodiment are described in the interest of concision. Below, the elements similar or identical to those of the first embodiment retain their numerical reference, while the different elements have a numerical reference followed by a single apostrophe (').

The female element 200' shown in FIG. 11 is specific in that it comprises memory elements 206' with a flat head 206.1' perpendicular to the movement axis D206 and individual return springs 220.1', i.e., a return spring 220.1' for each memory element 206'. Each spring 220.1' is then inserted between the flat head 206.1' of a memory element and a bearing part 222', comparable to the bearing ring 222, but which does not have an annular shape. Each spring 220.1' is centered on an axis combined with the movement axis D206 of the corresponding memory element.

FIGS. 12 to 15 relate to a coupling according to a third embodiment of the invention. Below, only the differences with respect to the first two embodiments are described in the interest of concision. Below, the elements similar or identical to those of the first or second embodiment retain their numerical reference, while the different elements have a numerical reference followed by a double apostrophe (").

The coupling of FIGS. 12 to 15 comprises a male element 100", shown alone in FIG. 12. Relative to the male element 100 according to the first embodiment, the male element 100" is specific in that it does not comprise a relief comparable to the flange 106 of the first embodiment. This is called a "smooth end piece". In the third embodiment, the male element 100" comprises a male body 104" having an axial end surface S104", an outer radial surface 106.2" and a peripheral rounding 106.3" connecting the axial end surface S104" and the outer radial surface 106.2". The rounding 106.3" is optional. Alternatively, it may be replaced by a bevel.

The male body 104" also delimits an outer peripheral groove 108" that has, in section, an at least partially convex shape, i.e., curved.

The female element 200", shown alone in FIG. 13, is specific in that it comprises locking members 208' in the form of balls. Additionally, the memory elements 206" of the female element 200" are configured such that the distance d206' that separates them from the central axis X200 when they are in the distal position is smaller than the outer radius r104" of the outer radial surface 106.2' of the male body 104". Thus, the memory elements 206" are configured to cooperate with the front axial end of the male body 104", and in particular by contact and pushing back of the male elements 206" with the peripheral hollow 106.3" of the male body 104", during the coupling phase.

Indeed, when the male body 104" is received inside the female body 204", the hollow 106.3" pushes each memory element 206" from its distal position toward its proximal position, as shown by arrow F2" in FIG. 14. The locking members 208" are in turn kept in the unlocked position by the outer radial surface 106.2", such that they appear retracted in the thickness of the body 204. Indeed, they slide or roll around the outer radial surface 106.2" of the male body 104'" until they reach the peripheral groove 108'. Each locking member 208 can therefore be pushed back in the unlocked position by the outer radial surface 106.2". Once the locking members 208" axially reach the outer peripheral groove 108", they fall radially inside the latter under the effect of the pressure exerted by the locking ring 218, since the latter is resiliently loaded in the forward direction. The coupling is then in the configuration of FIG. 15. In this configuration, the locking ring 218 keeps the locking members 208" inside the peripheral groove 108".

Advantageously, the curve radius of the groove 108" can be provided at least partially equal to the radius of the locking balls 208'. In this way, the contact between the locking balls 200" and the male body 104" is not a periodic contact, but a linear contact. The forces are better distributed and the male body 104 experiences fewer plastic deformations related to the operation of the coupling.

During uncoupling, the balls 208" are dislodged from the groove 108" and enter the unlocked position. The locking ring 218 returns to the forward position, i.e., is rearmed, against the locking balls 208". The memory elements 206" are kept in the proximal position by the outer radial surface 106.2" of the male body 104" while the end piece, i.e., the male element 100", is not removed from the female element 200". Thus, the distance between the central axis X200 and the locking balls 200", when they are in the unlocked position, is identical to the distance between the axis X200 and the memory elements 206" when they are in the proximal position and is also identical to the outer radius r104" of the male body 104".

In an alternative that is not shown, the geometry of the memory elements 206, 206' or 206" can be different. For example, the memory elements could be needles, frustoconical shims, small rods, bolts, slides with a rectangular section or balls.

According to another alternative that is not shown, the front face 220.10 of the annulus 220.1 can be inclined relative to the movement axis D206 of the corresponding memory element 206. In particular, the annulus 220.1 could have a front face that is purely axial, i.e., perpendicular to the axis X200. In this scenario, the pins 206 or 206" could be longer and include a head that is not hemispherical, but beveled, the end face of which would be perpendicular to the central axis X200.

According to another alternative that is not shown, it is possible to use a return means for the memory elements different from those shown. For example, the return means for the memory elements could be formed by a single resilient element, in the form of a roll, that would be axially deformable in compression. Additionally, a simple flexible metal tongue could be used.

According to another alternative that is not shown, the coupling does not include locking levers 226. In this case, the locking of the locking ring 218 in the forward position could be done using a dual maneuvering system consisting of a return button positioned in place of the lever and with which the pressure from a finger upon disconnection on the button causes the release of a locking element from the ring. Additionally, the coupling could very well have no system for locking the locking ring 18 in the forward position.

According to another alternative that is not shown, applicable to the first two embodiments, the bevels 2088.1, 2086.1 and 2088.2 could have an incline different from 45°.

According to another alternative that is not shown, the male and female gate system could be reversed. In this case, the male element would have a stationary piston and a drawer movable around the stationary piston, and the female element would have a translatable central gate.

According to another alternative that is not shown, the outer peripheral groove 106 or 106" could be replaced by several separate housings, distributed around the male body and each intended to receive a corresponding locking member.

According to another alternative that is not shown, the number of memory elements is strictly smaller than the number of locking members. In other words, it is not essential for each locking member 208 or 208" to be kept in the unlocked position by a complementary memory element. What matter is indeed to have at least one locking member that is kept in the unlocked position and emerging from the female body so as to keep the locking ring in the intermediate position, and therefore to have at least one memory element.

The features of the three embodiments and shown in the figures and alternatives that are not shown that are outlined above may be combined with one another to create new embodiments of the invention.

The invention claimed is:

1. A female quick coupling element, for joining pressurized pipes, said female quick coupling element being able to be coupled with a complementary male element and comprising:
   a hollow female body defining a central axis,
   locking members, each locking member being radially movable inside a corresponding radial opening of the hollow female body between:
      a locked position, in which the locking member it-protrudes radially inside the hollow female body, and
      an unlocked position, in which the locking member is further from the central axis than in the locked position,
   at least one memory element, movable along a movement axis between:

a distal position, in which the memory element opposes the movement of a locking member from the unlocked position to the locked position, and a proximal position, in which the memory element does not oppose the movement of the locking member from the unlocked position toward the locked position, and a locking ring, which is axially movable between:

a forward position, in which the locking ring keeps the locking members in the locked position, and a withdrawn position, in which the locking ring does not keep the locking members in the locked position, wherein:

each memory element is received in a housing defined in a thickness of the hollow female body, each memory element is, in the distal position, closer to the central axis than the locking members in the unlocked position, and the movement axis of each memory element between the distal position and the proximal position is inclined relative to the central axis of the hollow female body.

2. The female quick coupling element according to claim 1, wherein when the locking ring is in an intermediate position, positioned axially between its forward position and its withdrawn position, at least one locking member in the unlocked position opposes a resilient return of the locking ring toward its forward position.

3. The female quick coupling element according to claim 1, wherein the movement axis of each memory element between its distal position and its proximal position is inclined relative to the central axis by an angle comprised between 20° and 40°.

4. The female quick coupling element according to claim 1, comprising a return means for returning each memory element to the distal position.

5. The female quick coupling element according to claim 4, wherein the return means comprises an annulus, which is axially movable between the hollow female body and the locking ring and which is resiliently loaded against the memory element.

6. The female quick coupling element according to claim 5, wherein each memory element has a hemispherical head, configured to cooperate with the annulus.

7. The female quick coupling element according to claim 1, wherein the locking members each have a noncircular section in a plane passing through the central axis.

8. The female quick coupling element according to claim 1, wherein the female element comprises several memory elements distributed regularly around the central axis.

9. The female quick coupling element according to claim 1, wherein each memory element is a pin with a cylindrical portion whose generatrices are parallel to its movement axis.

10. The female quick coupling element according to claim 1, wherein each memory element comprises a heel, with a frustoconical shape and configured to bear against a bevel of the locking member.

11. A coupling for removably joining two fluid passage pipes, this coupling comprising a female quick coupling element according to claim 1 and a complementary male element.

12. The coupling according to claim 11, wherein the male element includes a male body, which is able to push each memory element from its distal position toward its proximal position when it is received inside the female body and to cooperate with the locking members when they are in the locked position to prevent the axial removal of the male body outside the female body.

13. The coupling according to claim 12, wherein the male body includes a first surface able to push back each memory element to the proximal position and a second surface able to push back each locking member to the unlocked position, and wherein the first surface and the second surface are alongside one another.

14. The coupling according to claim 13, wherein the first surface and the second surface belong to a relief of the male body.

15. The coupling according to claim 13, wherein, during uncoupling, each memory element is returned to the distal position while the locking members are kept in the unlocked position by the second surface.

* * * * *